United States Patent [19]

Agarwal et al.

[11] Patent Number: 5,678,219

[45] Date of Patent: Oct. 14, 1997

[54] INTEGRATED ELECTRONIC WARFARE ANTENNA RECEIVER

[75] Inventors: Krishna K. Agarwal; Donald F. Shea, both of Plano, Tex.

[73] Assignee: E-Systems, Inc., Dallas, Tex.

[21] Appl. No.: 677,121

[22] Filed: Mar. 29, 1991

[51] Int. Cl.⁶ .................................................. H04B 1/18
[52] U.S. Cl. .......................... 455/280; 455/284; 455/289; 455/319; 455/338
[58] Field of Search ......................... 455/132, 272, 455/142, 333, 344, 293, 280, 284, 289, 318, 319, 338; 343/700 MS, 850, 853; H01Q 23/00

[56] References Cited

U.S. PATENT DOCUMENTS

| | | |
|---|---|---|
| 2,170,659 | 8/1939 | Kramer. |
| 3,054,370 | 9/1962 | Lozier. |
| 3,135,960 | 6/1964 | Kaiser, Jr.. |
| 3,761,927 | 9/1973 | Amoroso, Jr. ............... 342/156 |
| 3,778,834 | 12/1973 | Poppe et al. ................ 342/432 |
| 4,118,670 | 10/1978 | Dickens ....................... 455/327 |
| 4,358,768 | 11/1982 | Ernst et al. .................. 342/429 |
| 4,573,212 | 2/1986 | Lipsky ......................... 455/293 |

FOREIGN PATENT DOCUMENTS

| | | | |
|---|---|---|---|
| 0359238 | 3/1990 | European Pat. Off. | ....... H01Q 23/00 |
| 0311605 | 8/1988 | Japan | ............... H01Q 23/00 |

OTHER PUBLICATIONS

*Modern Dictionary of Electronics,* Graf, R., 1977, p. 62.

*Primary Examiner*—Reinhard J. Eisenzopf
*Assistant Examiner*—Thanh Le
*Attorney, Agent, or Firm*—Harold E. Meier

[57] ABSTRACT

An RF antenna and an associated receiver are proximately located in an integrated antenna/receiver unit thereby eliminating the need for baluns and inter-component cabling characteristic of prior designs. Integration of the receiver with the antenna provides for improved sensitivity as the need for utilizing signal dissipating and noise introducing cables and baluns to transmit the signal received by the antenna to the receiver is eliminated. Direct coupling of the antenna and receiver on a single gallium arsenide integrated circuit maintains balanced impedance from the antenna to the receiver.

2 Claims, 2 Drawing Sheets

5,678,219

INTEGRATED ELECTRONIC WARFARE ANTENNA RECEIVER

TECHNICAL FIELD

The present invention relates to radio frequency antennas and in particular to an integrated radio frequency antenna and receiver.

BACKGROUND OF THE INVENTION

In current electronic warfare systems, radio frequency antennas and receivers are separate components interconnected by coaxial cable. The antenna usually is of a spiral type, and its natural balanced impedance is transformed by use of a balun to the 50 ohm unbalanced characteristic impedance of the coaxial cable connecting the antenna to the receiver. At the receiver, a balun is again used to transform from the connecting coaxial cable's 50 ohm impedance to allow the receiver to be interconnected in a balanced manner to the cable and the antenna. Each balun transformation degrades the performance of the antenna receiver system by introducing power loss and impedance mismatch. Losses may also be generated as power received by the antenna is dissipated in the coaxial connecting cable. These losses cause phase tracking error and result in signal losses thereby reducing the sensitivity of the receiver.

Accordingly, there is a need for an antenna/receiver configuration eliminating the degrading effects of balun transformations and impedance losses thereby improving the sensitivity of the antenna and receiver.

SUMMARY OF THE INVENTION

In accordance with the present invention, the receiver is integrated with the antenna to eliminate the degrading effects on antenna/receiver sensitivity caused by the balun transformations and cable dissipation losses characteristic of prior art antenna and receiver configurations. According to the integrated antenna/receiver configuration of the present invention, the receiver circuits directly interface with the antenna terminals thus providing an integrated antenna/receiver unit having a balanced line impedance from the antenna through the receiver.

The integrated antenna/receiver unit of the present invention is comprised of a number of radio frequency (RF) amplifiers each coupled to an antenna terminal. An RF-to-IF mixer is coupled to the RF amplifier outputs for down converting and summing the received and amplified RF signals to an intermediate frequency (IF) signal. The IF signal output from the mixer is further amplified prior to being output for processing. Because the antenna and receiver are proximately located and directly coupled, impedance transforming baluns and coaxial connecting cables are not needed. Thus, the integrated antenna/receiver unit of the present invention eliminates the signal losses generated by baluns and cables in the prior art devices thereby providing better noise figure performance.

In addition to better noise figure performance, performing the frequency conversion proximate to the antenna further improves receiver sensitivity by eliminating the signal loss caused by signal dissipation during transmission over the cable connecting the antenna and the RF amplifier stage. The short distance between the antenna and the point of down conversion within the integrated receiver also reduces the phase tracking errors characteristic of the prior art devices due to long transmission path lengths between the antenna and the receiver.

BRIEF DESCRIPTION OF THE DRAWINGS

A more complete understanding of the integrated antenna/receiver unit of the present invention and its advantages and applications may be had by reference to the following Detailed Description when taken in conjunction with the accompanying Drawings wherein.

DETAILED DESCRIPTION

Figure 1:
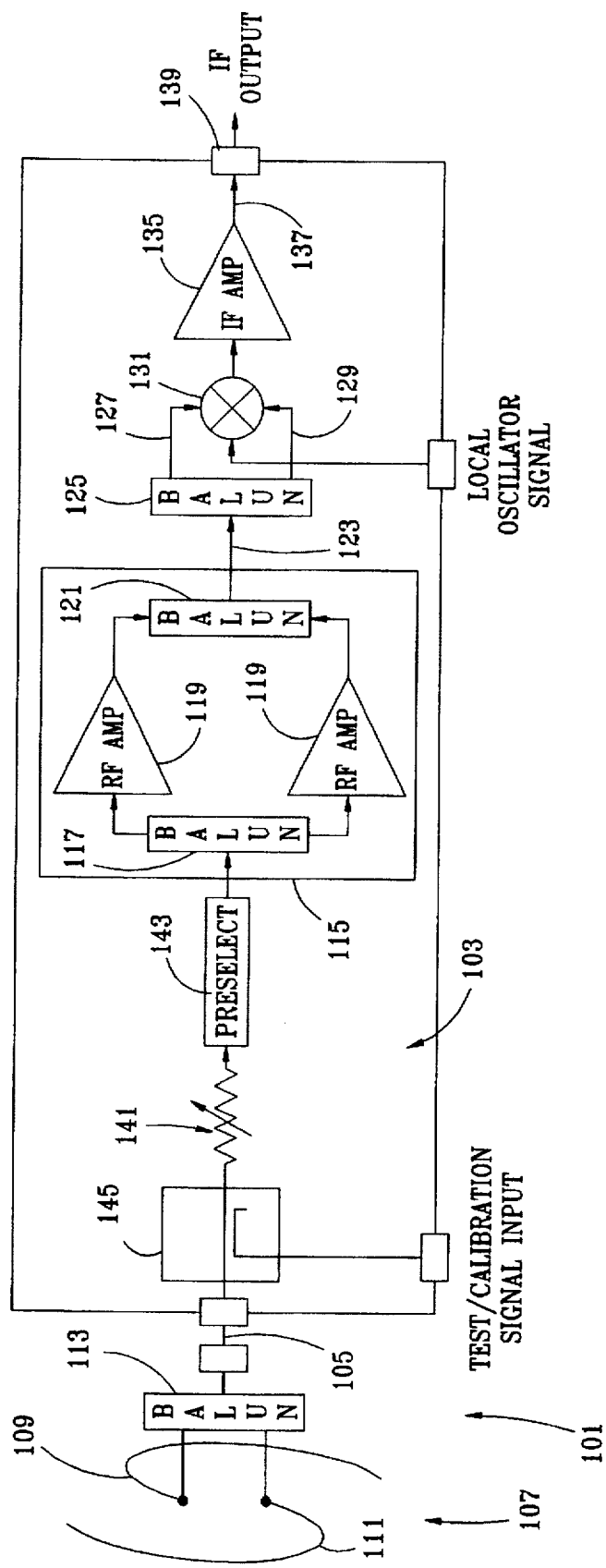
FIG. 1 is an electrical schematic of the prior art system architecture of an electronic warfare antenna/receiver system.

Referring to FIG. 1, there is shown a prior art electronic warfare antenna and receiver system 100. The prior art system 100 is comprised of two discrete components, an antenna unit 101 and a receiver unit 103. The antenna unit 101 and receiver unit 103 are coupled by a cable 105. Cable 105 is typically a coaxial cable having a characteristic impedance of 50 ohms, but may be any other cable capable of transmitting RF signals. Within the antenna unit 101 is a spiral antenna 107 having two antenna elements, 109 and 111 respectively. Antenna 107 is utilized by system 100 to receive RF electromagnetic signals for processing.

The characteristic impedance of the antenna 107 is not the same as that of coaxial cable 105. Accordingly, antenna elements 109 and 111 are connected to cable 105 through a balun 113. Balun 113 transforms the natural balanced impedance of antenna 107 to the 50 ohm unbalanced characteristic impedance of coaxial cable 105. Such a transformation generally degrades the signal received by antenna 107 by causing signal power dissipation losses and introducing noise.

Within the receiver unit 103 of system 100, there is a balanced RF amplifier 115. A first balun 117 within amplifier 115 interfaces the signal received over coaxial cable 105 with a pair of RF amplifiers 119 by transforming the 50 ohm cable impedance to match the input impedance of the amplifiers 119. A second balun 121 couples the outputs of the pair of RF amplifiers and provides on line 123 an RF amplifier output. The RF amplifier output signal on line 123 is applied to a balun 125 where the signal is split into two RF components on lines 127 and 129 prior to RF-to-IF down conversion. A mixer 131 accepts the RF signal components on lines 127 and 129 and a local oscillator signal on line 133 to downconvert the RF signal to IF. The IF signal generated by mixer 131 is amplified by IF amplifier 135 and output over line 137 to an IF output connector 139. The output signal at connector 139 is then further processed to recover the input electromagnetic signal received by antenna 107.

Prior to processing by the balanced RF amplifier 115 of the receiver 103, the received signal is typically attenuated by an attenuator 141 and passed through a preselector 143. A coupler 145 is also provided to allow an RF test signal to be applied to the receiver 103 for circuit testing and calibration.

Figure 2:
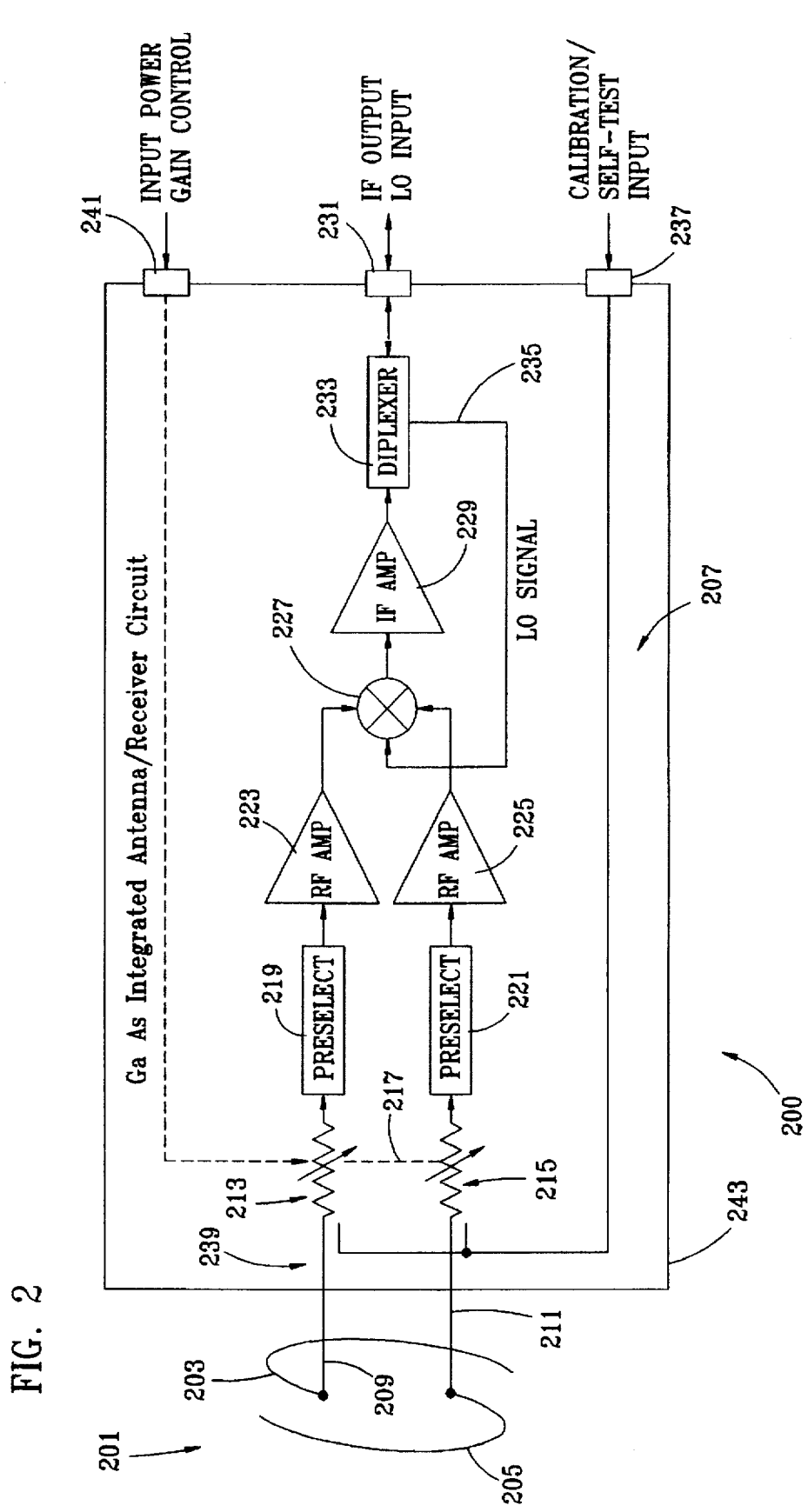
FIG. 2 is a electrical schematic of an integrated electronic warfare antenna/receiver unit embodying the present invention.

Referring now to FIG. 2, there is also shown an integrated antenna/receiver unit 200 of the present invention. A spiral antenna 201, comprised of a pair of antenna elements 203 and 205 is coupled to an integrated receiver 207 through a pair of antenna leads 209 and 211 respectively. Within the receiver 207, the leads 209 and 211 are connected, respectively, to gain control elements 213 and 215. The gain control elements 213 and 215 are commonly coupled, as generally indicated at 217, to provide for a balanced gain of the RF signals received by antenna 201.

The output of gain control elements 213 and 215 are connected, respectively, to preselect circuits 219 and 221. The output of preselect circuits 219 and 221 provide the input to a pair of RF amplifiers 223 and 225, which amplify the balanced RF signal provided on antenna leads 209 and 211. Mixer 227 down converts the output from RF amplifiers 223 and 225 to an IF signal, which is in turn provided to an IF amplifier 229. The amplified IF signal is provided by the IF amplifier 229 to an IF output connector 231.

The IF output connector 231 also serves as the local oscillator signal input. A diplexer 233 diplexes the local oscillator signal and the amplified IF signal so that RF cabling to the antenna is minimized. Line 235 couples the local oscillator signal from the diplexer 233 to mixer 227. To enable phase and amplitude calibration and also to self test the integrated antenna-receiver unit 200, an RF test signal may be coupled to connector 237 to interact with antenna leads 209 and 211 as generally indicated at 239. The RF test signal is then measured at connector 237 for testing and calibration. The integrated antenna/receiver unit 200 can thereby be used in amplitude and/or phase track systems.

The integrated antenna/receiver unit 200 may be incorporated to an integrated package 243, and its circuitry implemented using well known gallium arsenide MMIC construction on a single integrated circuit chip. Use of an integrated package 243 proximately locates the antenna 205 and receiver 207 thereby, eliminating the dissipation losses and noise introduction characteristic of separated antennas and receivers utilizing interconnecting cables and baluns. Package 243 is provided with three ports. Two of the three ports are connectors 231 and 237 for, respectively, the diplexed IF signal output and the local oscillator power input and the RF test signal input. The third port at connector 241 is used to provide direct current power to the circuit, as well as control signals for gain control elements 213 and 215.

While the invention has been described in connection with a preferred embodiment, it is not intended to limit the scope of the particular form set forth but, on the contrary, is intended to cover such alternatives, modifications and equivalents as may be included within the spirit and scope of the invention as defined in the appended claims.

We claim:

1. In an improved antenna/receiver integrated circuit having a balanced line impedance from the antenna through the receiver, wherein the antenna/receiver integrated circuit includes:

an integrated circuit board;

an RF antenna having a plurality of antenna elements;

an integrated circuit RF receiver formed on the integrated circuit board, said receiver having a common IF output and local oscillator input signal line and a plurality of RF inputs corresponding to the plurality of antenna elements, said integrated circuit RF receiver including a plurality of integrated circuit RF amplifiers at least equal in number to the plurality of antenna elements, wherein the integrated circuit RF receiver comprises:

an integrated circuit mixer receiving RF amplifier output signals, a local oscillator signal on the input signal line, and generating a down converted IF output signal on the input signal line;

an IF amplifier for receiving and amplifying the down converted IF output signals;

an integrated circuit diplexer coupled to the IF amplifier and the mixer to split the local oscillator input signal from the IF output and local oscillator input signal line;

a circuit directly coupling individual antenna elements to a corresponding integrated circuit RF amplifier for balanced line impedance from the antenna through the receiver and for minimizing phase tracking errors, said circuit including:

a plurality of integrated circuit gain control elements corresponding in number to the plurality of antenna elements, each of said integrated circuit gain control elements coupled to a corresponding antenna element;

means for commonly adjusting the gain control elements to provide for balanced gain of the RF signals received by the antenna; and a plurality of preselect integrated circuits corresponding in number to the plurality of antenna elements, said preselect integrated circuits individually coupled to the corresponding gain control elements to provide an input to the corresponding RF amplifiers.

2. The antenna/receiver unit as in claim 1, wherein the RF antenna is a spiral antenna.

* * * * *